United States Patent
Cleaver et al.

(10) Patent No.: US 12,112,646 B2
(45) Date of Patent: Oct. 8, 2024

(54) APPARATUS, METHOD AND SYSTEM RELATING TO AIRCRAFT SYSTEMS

(71) Applicant: UNIVERSITY OF BATH, Bath (GB)

(72) Inventors: David Cleaver, Bath (GB); Jonathan Du Bois, Bristol (GB); Pejman Iravani, Bath (GB)

(73) Assignee: UNIVERSITY OF BATH, Bath (GB)

( * ) Notice: Subject to any disclaimer, the term of this patent is extended or adjusted under 35 U.S.C. 154(b) by 42 days.

(21) Appl. No.: 17/056,390

(22) PCT Filed: May 16, 2019

(86) PCT No.: PCT/GB2019/051356
§ 371 (c)(1),
(2) Date: Nov. 17, 2020

(87) PCT Pub. No.: WO2019/220130
PCT Pub. Date: Nov. 21, 2019

(65) Prior Publication Data
US 2021/0225179 A1    Jul. 22, 2021

(30) Foreign Application Priority Data
May 18, 2018 (GB) .................... 1808158

(51) Int. Cl.
*G01C 21/00*   (2006.01)
*B64D 45/08*   (2006.01)
*G01C 23/00*   (2006.01)
*G05D 1/00*    (2006.01)
(Continued)

(52) U.S. Cl.
CPC ....... *G08G 5/0069* (2013.01); *G01C 21/3867* (2020.08); *G01C 21/3881* (2020.08); *G05D 1/0055* (2013.01); *G05D 1/0202* (2013.01); *G05D 1/101* (2013.01); *G08G 5/0039* (2013.01); *G08G 5/0086* (2013.01); *G08G 5/045* (2013.01)

(58) Field of Classification Search
None
See application file for complete search history.

(56) References Cited

U.S. PATENT DOCUMENTS

| 7,689,328 B2 * | 3/2010 | Spinelli | G05D 1/106 |
|---|---|---|---|
| | | | 701/16 |
| 9,542,849 B1 | 1/2017 | Bertram et al. | |
| 10,562,643 B1 * | 2/2020 | Strabala | G05D 1/101 |

(Continued)

OTHER PUBLICATIONS

Great Britain Intellectual Property Office, Search Report under Section 17(5) Issued in Application No. GB1808158.8, Nov. 30, 2018, 3 pages.

(Continued)

*Primary Examiner* — Adam D Tissot
*Assistant Examiner* — Michael T Silva
(74) *Attorney, Agent, or Firm* — McCoy Russell LLP

(57) ABSTRACT

A method for controlling flight of an aircraft system comprises deriving a liability map using mapping data related to one or more ground hazard categories, wherein each ground hazard category is associated with a type of hazard on a ground surface. The liability map comprises a plurality of risk liability values (L1 and/or L2) associated with the one or more ground hazard categories. The liability map is used to control one or more parameters for controlling flight of the aircraft system.

13 Claims, 14 Drawing Sheets

(51) Int. Cl.
*G08G 5/00* (2006.01)
*G08G 5/04* (2006.01)

(56) References Cited

U.S. PATENT DOCUMENTS

| | | | | |
|---|---|---|---|---|
| 2007/0285283 | A1* | 12/2007 | Bitar | G08G 5/0086 340/963 |
| 2010/0100308 | A1* | 4/2010 | Coulmeau | G08G 5/006 701/122 |
| 2014/0172390 | A1* | 6/2014 | Heinzerling | G08G 5/0052 703/2 |
| 2014/0343765 | A1* | 11/2014 | Suiter | G08G 5/025 701/18 |
| 2015/0032643 | A1* | 1/2015 | Loewen | G06Q 10/20 705/305 |
| 2016/0137309 | A1* | 5/2016 | Abernathy | G08G 5/0021 340/947 |
| 2016/0140851 | A1* | 5/2016 | Levy | G08G 5/0069 701/410 |
| 2016/0189549 | A1 | 6/2016 | Marcus | |
| 2016/0275801 | A1 | 9/2016 | Kopardekar | |
| 2017/0076610 | A1 | 3/2017 | Liu et al. | |
| 2017/0083979 | A1* | 3/2017 | Winn | H04Q 9/02 |
| 2017/0197729 | A1* | 7/2017 | Derenick | G06V 10/75 |
| 2018/0045814 | A1 | 2/2018 | Slapak et al. | |
| 2019/0014461 | A1* | 1/2019 | Winkle | G08G 5/0056 |
| 2019/0033862 | A1* | 1/2019 | Groden | G08G 5/0086 |
| 2019/0248487 | A1* | 8/2019 | Holtz | G06V 20/58 |
| 2020/0250596 | A1* | 8/2020 | Matthews | G08G 5/0026 |

OTHER PUBLICATIONS

ISA European Patent Office, International Search Report and Written Opinion Issued in Application No. PCT/GB2019/051356, Sep. 9, 2019, WIPO, 15 pages.

European Patent Office, Office Action Issued in Application No. 19726103.5, Jan. 22, 2024, Netherlands, 7 pages.

* cited by examiner

APPARATUS, METHOD AND SYSTEM RELATING TO AIRCRAFT SYSTEMS

CROSS REFERENCE TO RELATED APPLICATIONS

The present application is a U.S. National Phase of International Application No. PCT/GB2019/051356 entitled "APPARATUS, METHOD AND SYSTEM RELATING TO AIRCRAFT SYSTEMS," and filed on May 16, 2019. International Application No. PCT/GB2019/051356 claims priority to Great Britain Patent Application No. 1808158.8 filed on May 18, 2018. The entire contents of each of the above-listed applications are hereby incorporated by reference for all purposes.

TECHNICAL FIELD

The embodiments described herein relate to an apparatus, method and system relating to aircraft systems, and in particular to an apparatus, method and system for controlling flight of an aircraft system, for example an unmanned aircraft system, based on ground hazards, and for determining risk liability values associated with flight of an aircraft system.

BACKGROUND

Unmanned aircraft systems (UASs, also commonly known as "drones") are becoming increasing popular for a variety of applications, including for example surveillance operations or the delivery of objects to remote locations.

An obstacle to the wide use of unmanned aircraft systems is the integration of such unmanned aircraft systems into national airspace. One concern is the risk of collision with ground hazards, such as buildings, power cables, mountains and so forth. Another concern is the damage that could be caused to humans or structures on the ground, for example as a result of a crash or failure of UASs.

SUMMARY

It is an aim of the embodiments described herein to provide a method, apparatus and system which obviate or reduce at least one or more of the disadvantages mentioned above.

According to a first aspect of the present invention there is provided a method for controlling flight of an aircraft system. The method comprises deriving a liability map using mapping data related to one or more ground hazard categories, wherein each ground hazard category is associated with a type of hazard on a ground surface. The liability map comprises a plurality of risk liability values associated with the one or more ground hazard categories. The liability map is used to control one or more parameters for controlling flight of the aircraft system.

According to another aspect of the present invention there is provided an aircraft system comprising a processor and a memory, said memory containing instructions executable by said processor. The aircraft system is operative to use a liability map to control one or more parameters for controlling flight of the aircraft system. The liability map comprises a plurality of risk liability values associated with one or more ground hazard categories, and wherein each ground hazard category is associated with a type of hazard on a ground surface.

According to another aspect, there is provided a flight control system for controlling an aircraft system, the flight control system comprising a processor and a memory, said memory containing instructions executable by said processor. The flight control system is operative to derive a liability map using mapping data related to one or more ground hazard categories, wherein each ground hazard category is associated with a type of hazard on a ground surface. The liability map comprises a plurality of risk liability values associated with the one or more ground hazard categories. The flight control system is operative to use the liability map to control one or more parameters for controlling flight of the aircraft system.

According to another aspect there is provided a method of determining risk liability value associated with a flight of an aircraft system in relation to hazards on a ground surface. The method comprises deriving a liability map using mapping data related to one or more ground hazard categories, wherein each ground hazard category is associated with a type of hazard on a ground surface. The liability map comprises a plurality of risk liability values associated with the one or more ground hazard categories. The method comprises using the liability map to determine a risk liability value ($L_{FLIGHT}$) associated with a flight.

According to another aspect there is provided a risk liability engine for determining a risk liability value associated with a flight of an aircraft system in relation to hazards on a ground surface, said risk liability engine comprising a processor and a memory, said memory containing instructions executable by said processor. The risk liability engine is operative to derive a liability map using mapping data related to one or more ground hazard categories, wherein each ground hazard category is associated with a type of hazard on a ground surface. The liability map comprises a plurality of risk liability values associated with the one or more ground hazard categories. The risk liability engine is operative to use the liability map to determine a risk liability value associated with a flight.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
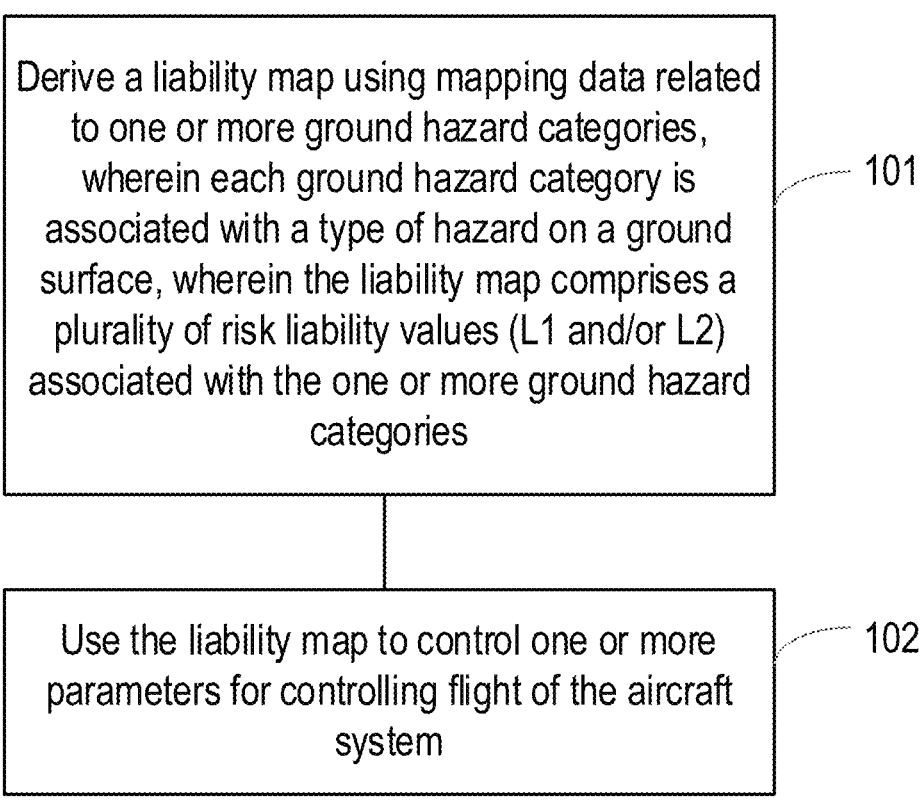
FIG. 1 shows an example of a method according to an embodiment.

The following sets forth specific details, such as particular embodiments for purposes of explanation and not limitation. But it will be appreciated by one skilled in the art that other embodiments may be employed apart from these specific details. In some instances, detailed descriptions of well-known methods, processes and devices are omitted so as not to obscure the description with unnecessary detail. Those skilled in the art will appreciate that the functions described may be implemented in one or more apparatus or nodes using hardware circuitry (e.g., analog and/or discrete logic gates interconnected to perform a specialized function, ASICs, PLAs, etc.) and/or using software programs and data in conjunction with one or more digital microprocessors or general purpose computers. Apparatus or nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed, with some or all the computing functions being cloud based. Moreover, these terms also refer to other hardware capable of performing such functions and/or executing software, such as the example hardware recited above.

References herein will be made to the term "aircraft system", which is intended to embrace both unmanned aircraft systems (UASs) and manned aircraft systems.

References will also be made herein to the term "voxel", which is used to represent a volume in three-dimensional space. A three dimensional array of voxels can therefore be used to represent a larger three-dimensional space, each particular voxel referring to a point, volume or region in that three-dimensional space.

It is noted that a voxel may comprise any shape, including for example rectangular, cuboid, spherical or tetrahedral shapes. Different voxels in an array may have the same shape, or may have different shapes, or a combination thereof. Voxels may be of any size, for example according to a desired granularity by which the three-dimensional space is to be defined. Different voxels in an array may have the same size, or may have different sizes, or a combination thereof.

It is further noted that individual voxels in the array of voxels may be adjacent or contiguous, such that every particular point in the three dimensional space falls within a particular voxel. Alternatively, individual voxels may be spaced apart or non-contiguous.

The embodiments described herein are related to a method, apparatus and system for quantifying liability for aircraft systems, such as unmanned aircraft systems, from hazards on the ground. As will be described in greater detail in the description below, embodiments of the invention are related to deriving a liability map of a region of interest, for use in applications such as controlling the flight of an aircraft system, or determining risk liabilities associated with flights, or other applications as described later in the application. In some embodiments a two-dimensional (2D) liability map relating to ground hazards is determined, which may also be referred to as a 2D surface liability map. The 2D liability map may be used for applications such as controlling flight of an aircraft system, for example determining planned landing sites, determining emergency landing sites (e.g. during planning and/or in-flight). The 2D liability map may also be used by some embodiments to create a three-dimensional (3D) liability map, which in turn may be used for applications such as determining a risk liability value of a particular flight, or various other applications as described in further detail in the description below. It is noted that, as well as being derived from a 2D liability map, the 3D liability map may also be derived from other data, which is also described in greater detail later in the application.

FIG. 1 shows an example of a method according to an embodiment, for controlling flight of an aircraft system.

The method comprises, in step 101, deriving a liability map using mapping data related to one or more ground hazard categories, wherein each ground hazard category is associated with a type of hazard on a ground surface, and wherein the liability map comprises a plurality of risk liability values (L1 and/or L2) associated with the one or more ground hazard categories.

The method comprises using the liability map to control one or more parameters for controlling flight of the aircraft system, step 102.

Figure 2:
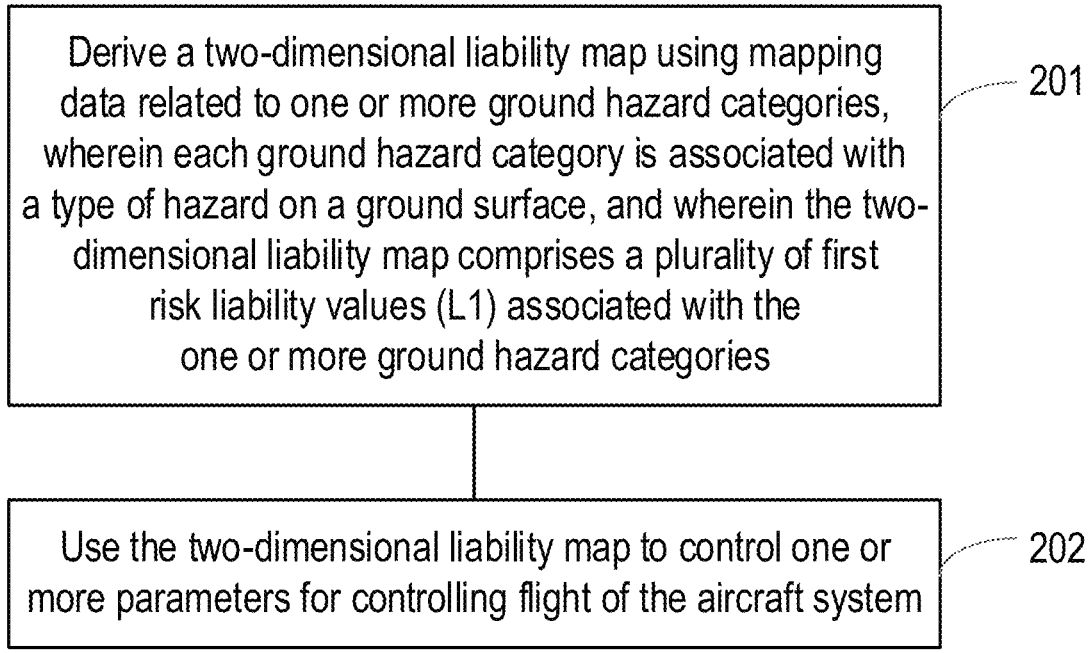
FIG. 2 shows an example of a method according to an embodiment.

FIG. 2 shows an example of a method according to an embodiment, for controlling flight of an aircraft system, in which a two-dimensional (2D) liability map is used.

The method comprises, in step 201, deriving a two-dimensional liability map using mapping data related to the one or more ground hazard categories, wherein the two-dimensional liability map comprises a plurality of first risk liability values associated with the one or more ground hazard categories.

The method comprises using the two dimensional liability map to control one or more parameters for controlling flight of the aircraft system, step 202.

The one or more parameters that may be controlled may comprise, for example, parameters that determine a flight path for an aircraft system, for example during landing, based on the 2D liability map, for example to avoid one or more ground hazards, or particular ground hazard categories (e.g. populated areas, roads, schools, etc.).

In another example, the one or more parameters that may be controlled may comprise a flight path associated with an emergency landing, for example when deciding where best to land after a failure mode of the aircraft system. As such, the method may be used to provide autonomous decision making in the event of a system failure of the aircraft system. For example, the method may be used to automatically detect emergency landing sites, or to avoid landing at certain sites, such as populated areas, roads, etc.

The 2D liability map has the advantage of providing increased situational awareness for an operator of an aircraft system, and enabling automatic or autonomous decision making.

As well as being used for these various applications, the 2D liability map may also be used for deriving a more complex three-dimensional (3D) liability map, as will be described later in the application.

Figure 3:
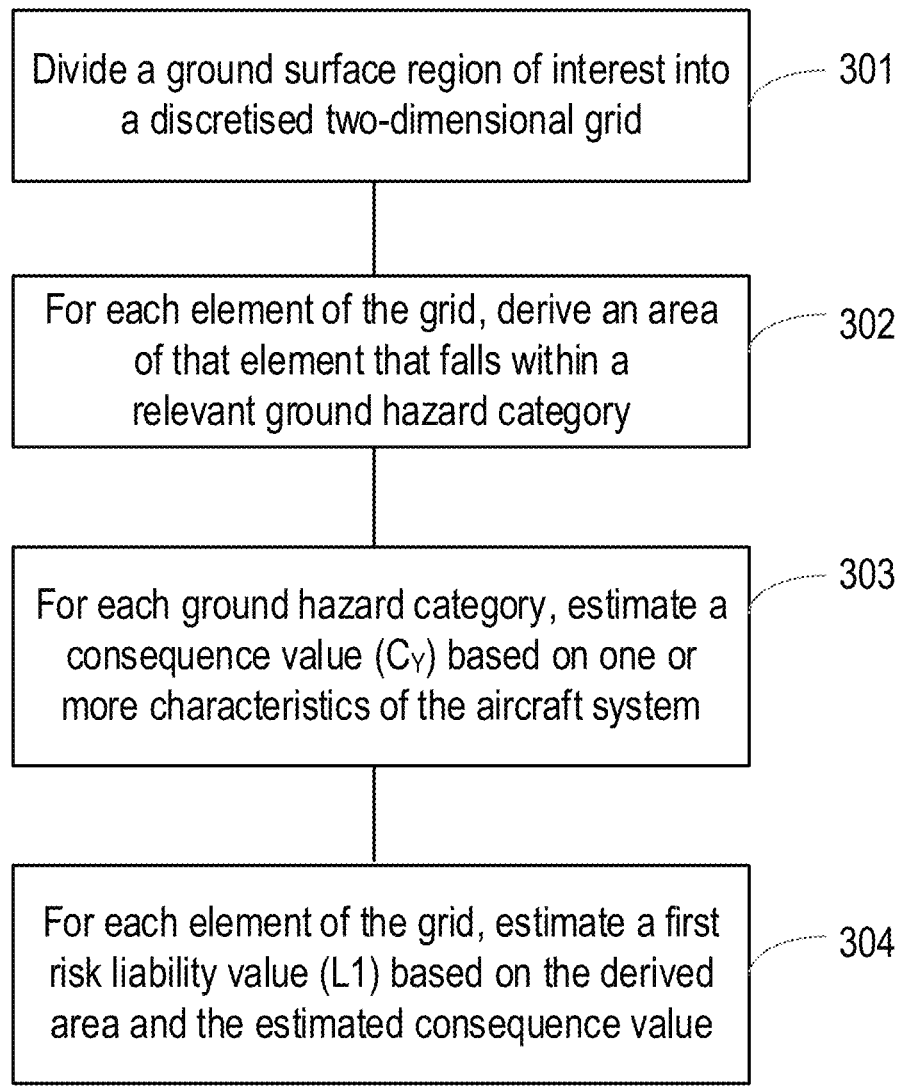
FIG. 3 shows an example of a method according to an embodiment.

FIG. 3 illustrates an example method for deriving the two-dimensional liability map according to step 201 of FIG. 2.

The method comprises dividing a ground surface region of interest into a discretised two-dimensional grid, step 301.

The method comprises, for each element of the grid, deriving an area of that element that falls within a relevant ground hazard category, step 302. For example, the step may comprise deriving what area of the grid element comprises ground hazard categories such as buildings, roads, airports, schools, mountains, etc.

The method comprises, for each ground hazard category, estimating a consequence value $C_Y$ based on one or more characteristics of the aircraft system, step 303. For example, for an aircraft system that comprises a very light drone, a consequence value of colliding with a building will be low compared to a consequence value of an aircraft system comprising a more substantial drone.

The consequence values may be estimated, for example, using one or more parameters, e.g. a parameter or a combination of parameters selected from a set of possible parameters, whereby the selected parameter(s) can differ, for example, depending on the ground hazard category, and/or the type of aircraft system.

For example, for a ground hazard category relating to "roads", the one or more parameters may include:
1. Aircraft Wing Span—which determines the crash area;
2. Traffic Density—which in some examples can be live traffic data, or in other examples mean traffic data (e.g. from a Department for Transport) for that particular road for that particular time, or in other examples mean traffic data for roads of that type, e.g. factoring in the time of day;
3. Vehicle Stopping Distances—for example using mean vehicle speeds (e.g. on that road type).

Embodiments of the invention can use any combination of the parameters above, or other parameters similar to those above, in order to provide an estimate of the number of vehicles that would be involved if an aircraft system crashed on that road. This information may be combined with other parameters relating to the aircraft system, for example the aircraft kinetic energy, to estimate the severity of an aircraft failure, e.g. fatalities. In some examples standard liability values may be used to associate a figure to the damage caused to vehicles, people, etc.

From the above it can be seen that each ground hazard category may have one or more parameters used to estimate a consequence of a particular aircraft system, or type of aircraft system, having a failure.

The method of FIG. 3 comprises, for each element of the grid, estimating a first risk liability value (L1) based on the derived area and the estimated consequence value, step 304.

As such, the 2D liability map comprises a matrix of first risk liability values (L1) for a particular aircraft system. Likewise a different aircraft system will have a corresponding matrix of first risk liability values (L1). As such, each element of the grid may comprise a set of first risk liability values (e.g. $L1_1$ to $L1_N$), each member of the set relating to a particular aircraft system or type of aircraft system, from N different aircraft system types. Thus, the first risk liability values of the 2D liability map can be different for different aircraft systems, i.e. depending on how they interact/relate with different ground hazard categories. The consequence values noted above can depend, for example, on the 'landing' characteristics of an aircraft system in each of its failure modes. In such embodiments the 2D liability map can be dependent on factors such as: size of aircraft system, velocity in failure mode, probability of failure mode.

In some examples the step of deriving the area of the element that falls within a relevant ground hazard category may comprise using mapping data, for example open source mapping data that is available for categorising the surface area of the earth into one of a number of different categories. It is noted that different levels or degrees of categorisation may be used depending on the desired complexity or granularity of the system.

According to one example the step of estimating a first risk liability value L1 comprises multiplying the area ratio for a particular ground hazard by its associated consequence value $C_Y$, and summing these for all areas of the grid element. As such, in one example a first risk liability value L1 comprises:

$$L1 = \Sigma \text{area ratio} * \text{consequence value}(C_Y)$$

Figure 4A:
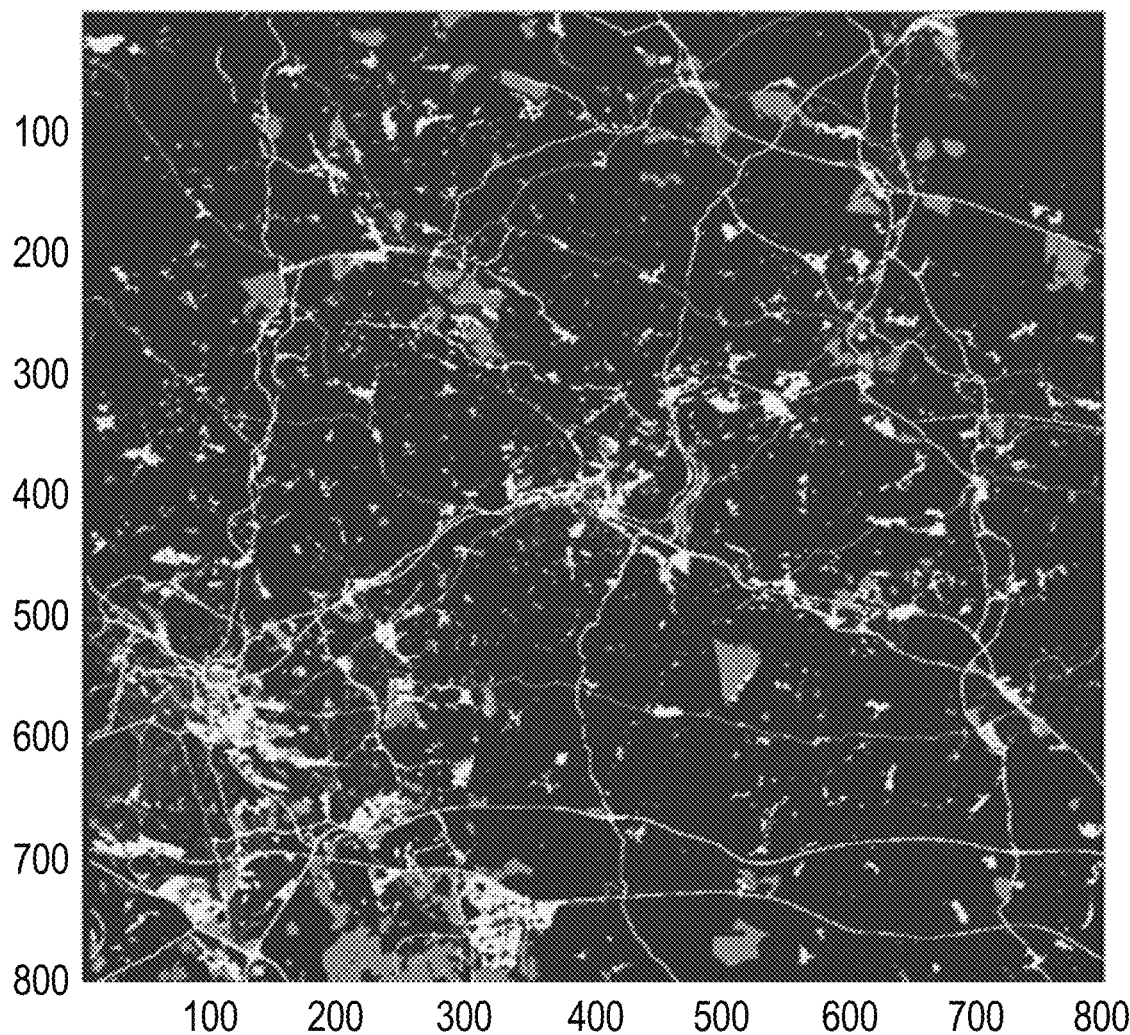
FIG. 4a shows an example of a two-dimensional liability map.

FIG. 4a shows an example of a 2D liability map, wherein different levels of greyscale illustrate different levels of first risk liability value, e.g. a darker value of the greyscale corresponding to a higher first risk liability value, or a lighter value of the greyscale corresponding to a lower first risk liability value.

It is noted that references herein to 2D liability map may comprise a 2D matrix of values representative of values on a 3D terrain surface. In some examples the 2D liability map is assumed to be flat, with the calculations/aircraft using Above Ground Level altitude. In other examples the 2D liability map is assumed to be a surface representative of the terrain, for example as in FIG. 8 described below, wherein the calculations/aircraft use Absolute altitude.

Figure 4B:
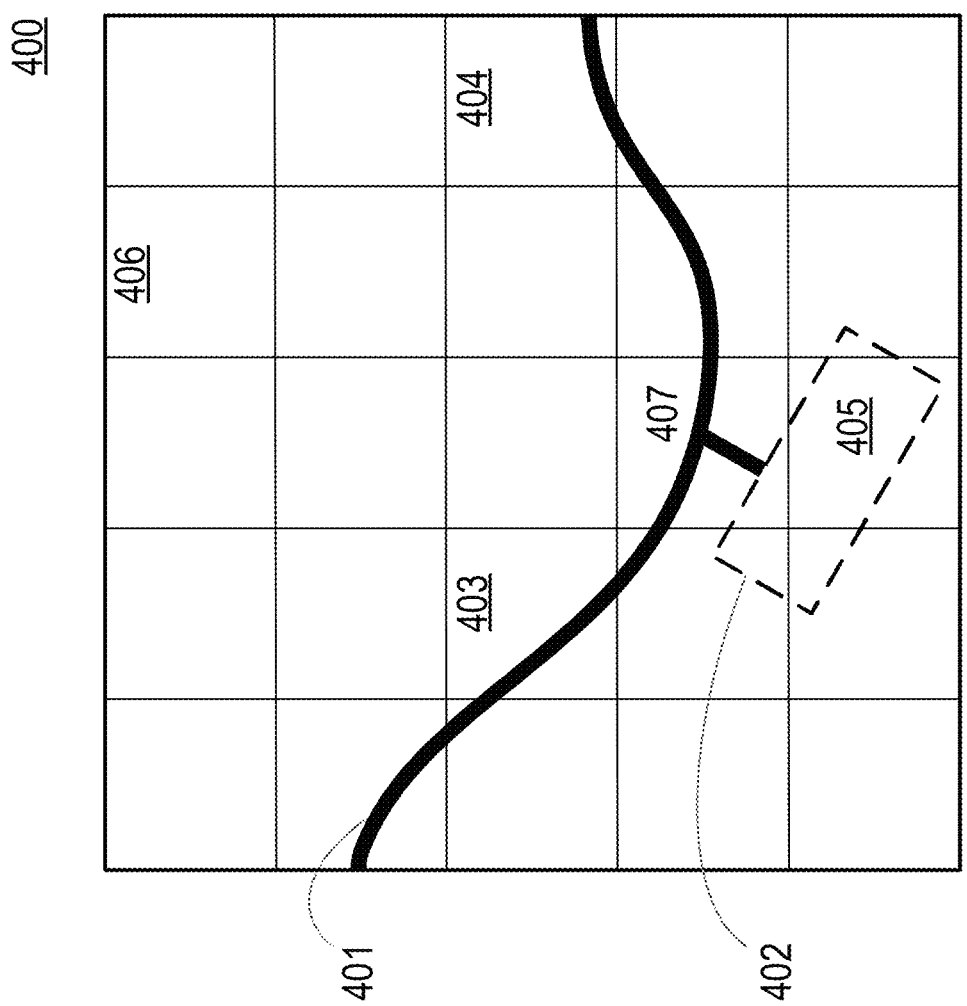
FIG. 4b shows an example of a simplified illustration of a portion of a two-dimensional liability map.

FIG. 4b shows an example of a simplified portion of a 2D liability map, to illustrate how an element of a grid has a corresponding first risk liability value.

FIG. 4b shows a plan view of an example of a region of interest 400 of a surface, i.e. ground surface. This region of interest 400 comprises a road 401 and a building 402, for example a school.

As described in FIG. 3 above, the region of interest 400 is divided into a discretised two-dimensional grid. It is noted that although the grid in FIG. 4b is shown as comprising elements, e.g., grid element 406, having the same surface area, the grid elements may differ in size, or may have different scales depending upon the level of detail in a particular region of interest.

As mentioned in FIG. 3 above, the method comprises, for each element of the grid, deriving an area of that element that falls within a relevant ground hazard category. For example, the step may comprise deriving what area of the grid element 403 comprises a ground hazard category such as a building, a road, an airport, a school, a mountain, etc.

In the example of FIG. 4b, grid element 403 will have a certain area relating to the ground hazard category relating to roads, which will be a greater area compared to grid element 404 for the ground hazard relating to roads, i.e. which has a smaller area for roads.

The grid element 405 will have a certain area relating to the ground hazard category relating to schools.

The grid element 407, on the other hand, will have a certain area relating to the ground hazard category relating to roads, and a certain area relating to the ground hazard category relating to schools.

For each ground hazard category, when estimating a consequence value based on one or more characteristics of the aircraft system, in the example of FIG. 4b the consequence value associate with a school may be higher than a consequence value associate with a road.

As such, the first risk liability value $L_{405}$ estimated for grid element 405 (i.e. having a school) may be higher than the first risk liability value $L_{403}$ estimated for grid element 403 (i.e. having a road).

The first risk liability values L1 may be used for various applications, including controlling the flight of an aircraft system, determining a preferred flight path for an aircraft system, or determining a liability associated with a particular flight, for example for use with determining insurance premiums, as will be described later in the application.

According to another aspect there is provided a method for deriving a three-dimensional liability map using mapping data related to the one or more ground hazard categories, wherein the three-dimensional liability map comprises a plurality of second risk liability values (L2) associated with the one or more ground hazard categories. The three-dimensional liability map is used to control the one or more parameters for controlling flight of the aircraft system.

In some examples the second risk liability values of the 3D liability map are determined for each node/voxel of a 3D region directly from an input data set.

In other examples, as mentioned above, the 2D liability map as described above may be used to derive the three-dimensional, 3D, liability map.

The 3D liability map may be based on a plurality of possible failure modes of an aircraft system and a related probability frequency of the occurrence of each possible failure mode.

Figure 5:
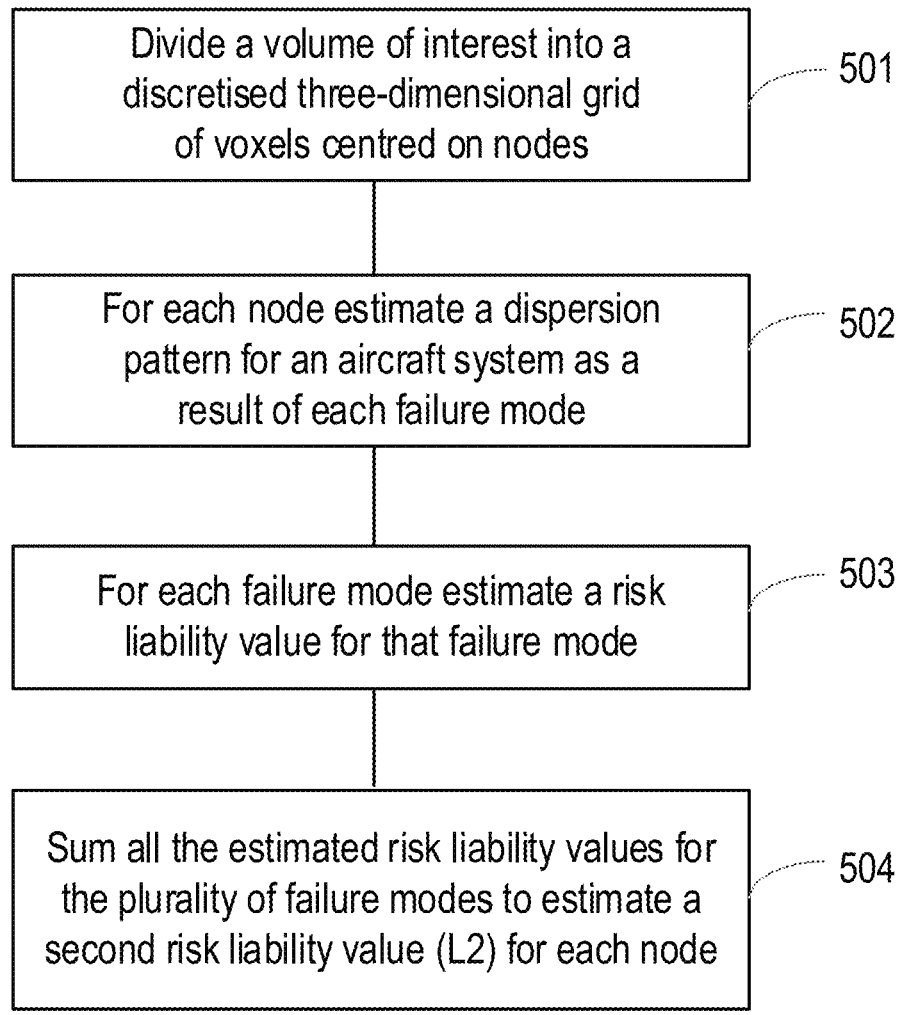
FIG. 5 shows an example of a method according to an embodiment.

Referring to FIG. 5, in one embodiment the method of deriving a three-dimensional liability map may comprise dividing a volume of interest into a discretised three-dimensional grid of voxels centred on nodes, step 501.

The method may comprise, for each node, estimating a dispersion pattern for the aircraft system as a result of each failure mode, step 502.

For each failure mode, a risk liability value is estimated for that failure mode, step 503. For example, for a controlled descent the risk liability value may be the minimum risk liability from the 2D liability map within the dispersion range, whereas for an uncontrolled decent the risk liability value may comprise a mean or Gaussian weighted mean of the 2D surface risk liability within the dispersion range.

The method comprises summing all the estimated risk liability values for the failure modes to estimate the second risk liability value L2, e.g. a total risk liability value, for each node, step 504.

In some examples, estimating a risk liability value for a particular failure mode at a particular node is based on the dispersion pattern for that failure node in relation to the position of the node of that voxel in relation to a ground surface (e.g. height above ground), and the position of the node in relation to first risk liability values of elements of the two-dimensional liability map. In other words, the risk liability values can take into consideration the height of an aircraft system at the point of failure, and the first risk liability values contained within the dispersion region, in order to estimate an overall risk liability value for that failure mode.

Figure 6:
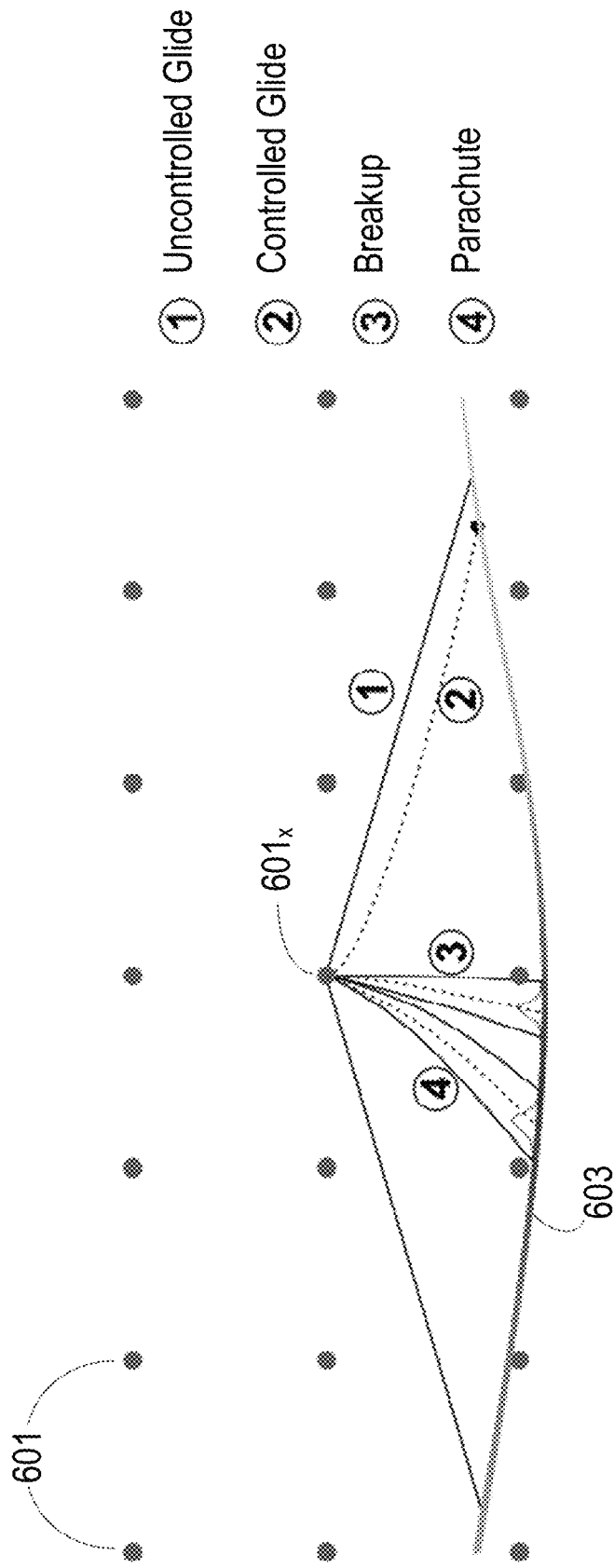
FIG. 6 shows an example to illustrate different failure modes in relation to nodes of voxels of a three-dimensional liability map.

FIG. 6 shows an example of dispersion patterns for different types of failure mode. The nodes 601 represent nodes of a 3D liability map, i.e. corresponding to voxels in a three-dimensional region of interest, in relation to a ground surface 603.

Assuming a failure occurs to an aircraft system around node $601_X$, then reference "1" represents a dispersion pattern corresponding to an uncontrolled glide, for example if the aircraft system has a power failure. With this type of failure mode, the aircraft system is modelled as landing anywhere within the glide range of the aircraft system relative to the point at which the failure mode occurred.

Reference "2" represents a dispersion pattern corresponding to a controlled glide, for example if the aircraft system has an engine failure, but is still able to control its flight path to some degree.

Reference "3" represents a dispersion pattern corresponding to a breakup, for example as a result of an explosion or catastrophic failure, which is modelled as the aircraft system landing approximately underneath the point at which the failure mode of the aircraft system occurred, with some effect due to residual momentum and wind speed.

Reference "4" represents a dispersion pattern corresponding to a parachute, for example as a result of failure of the aircraft system followed by the deployment of a parachute, which is modelled as the aircraft system landing nearby the point at which the failure mode of the aircraft system occurred (for example modelled based on typical wind directions in that area).

It is noted that other dispersion patterns may be used, and/or other failure modes. It is also noted that different aircraft system types may have different dispersion patterns associated therewith.

As described above in FIG. 5, since the method according to this embodiment sums all the estimated risk liability values for the failure modes in order to estimate the second risk liability value L2 for each node, this means that the second risk liability value L2 takes account, for each voxel, the risk associated with different types of failure modes that could occur in that voxel, and how these risks relate to the ground hazards in a surrounding area on a ground surface.

In some embodiments the one or more parameters for controlling flight are controlled in relation to the estimated first risk liability values L1. In other words, a flight may be controlled using the 2D liability map.

In other embodiments, one or more parameters for controlling flight are controlled in relation to the estimated second risk liability values L2. In other words, a flight may be controlled using the 3D liability map, i.e. based on the second risk liability values for the nodes relating to voxels.

In other embodiments, one or more parameters for controlling flight are controlled in relation to the estimated first and second risk liability values L1, L2.

It is noted that, although the 3D liability map in the examples above is shown as being derived based on a 2D liability map, the 3D liability map may also be derived directly from other data, for example including mapping data comprising information relating to ground hazard categories, and/or data relating to aircraft systems.

Figure 7:
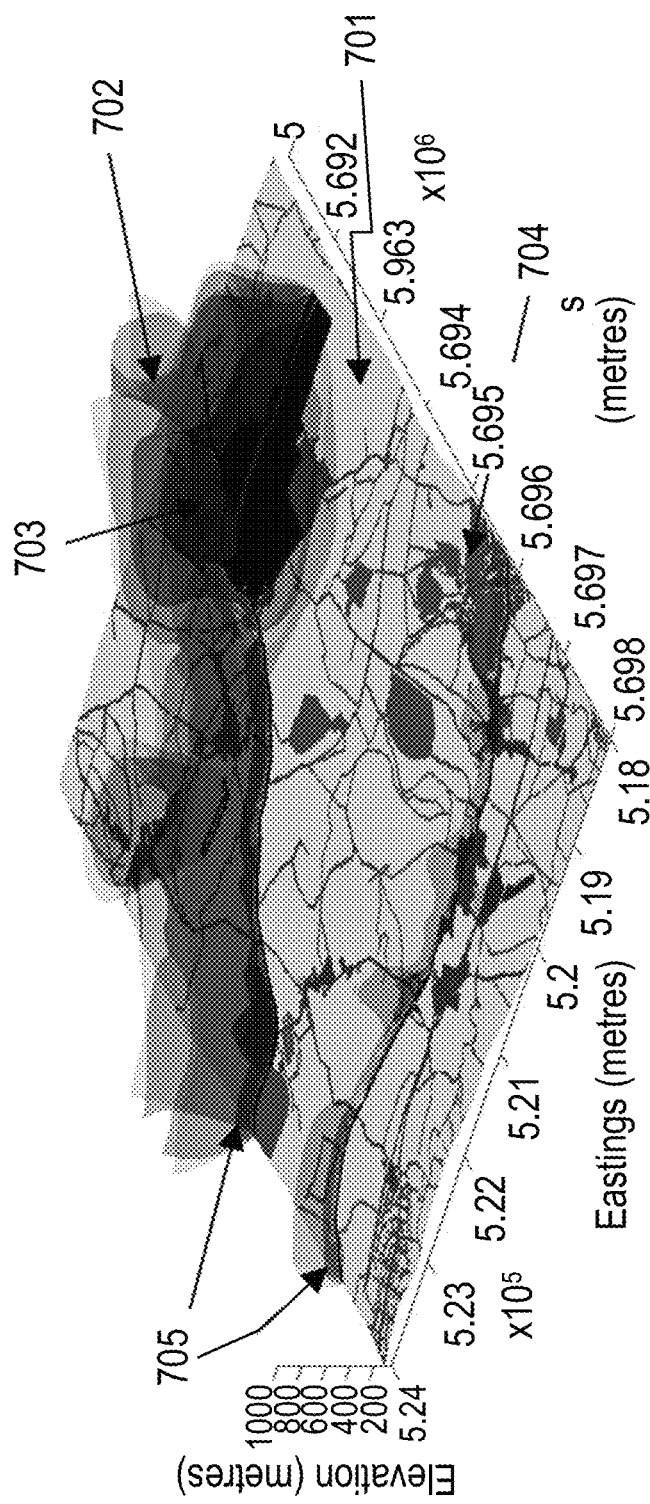
FIG. 7 shows another example of a three-dimensional liability map.

FIG. 7 shows a first example of a region including renders of both a 2D and 3D liability map. Different surface contour levels of greyscale illustrate different levels of first risk liability value, the isosurfaces representing the second risk liability values. FIG. 7 shows a contour of a 2D liability map 701, and isosurfaces of a 3D liability map 702. The dark areas 703 correspond to second risk liability values in the vicinity of an airport. The areas 705 correspond to second risk liability values relating to roads, while the dark areas 704 correspond to second risk liability values relating to a town.

Figure 8:
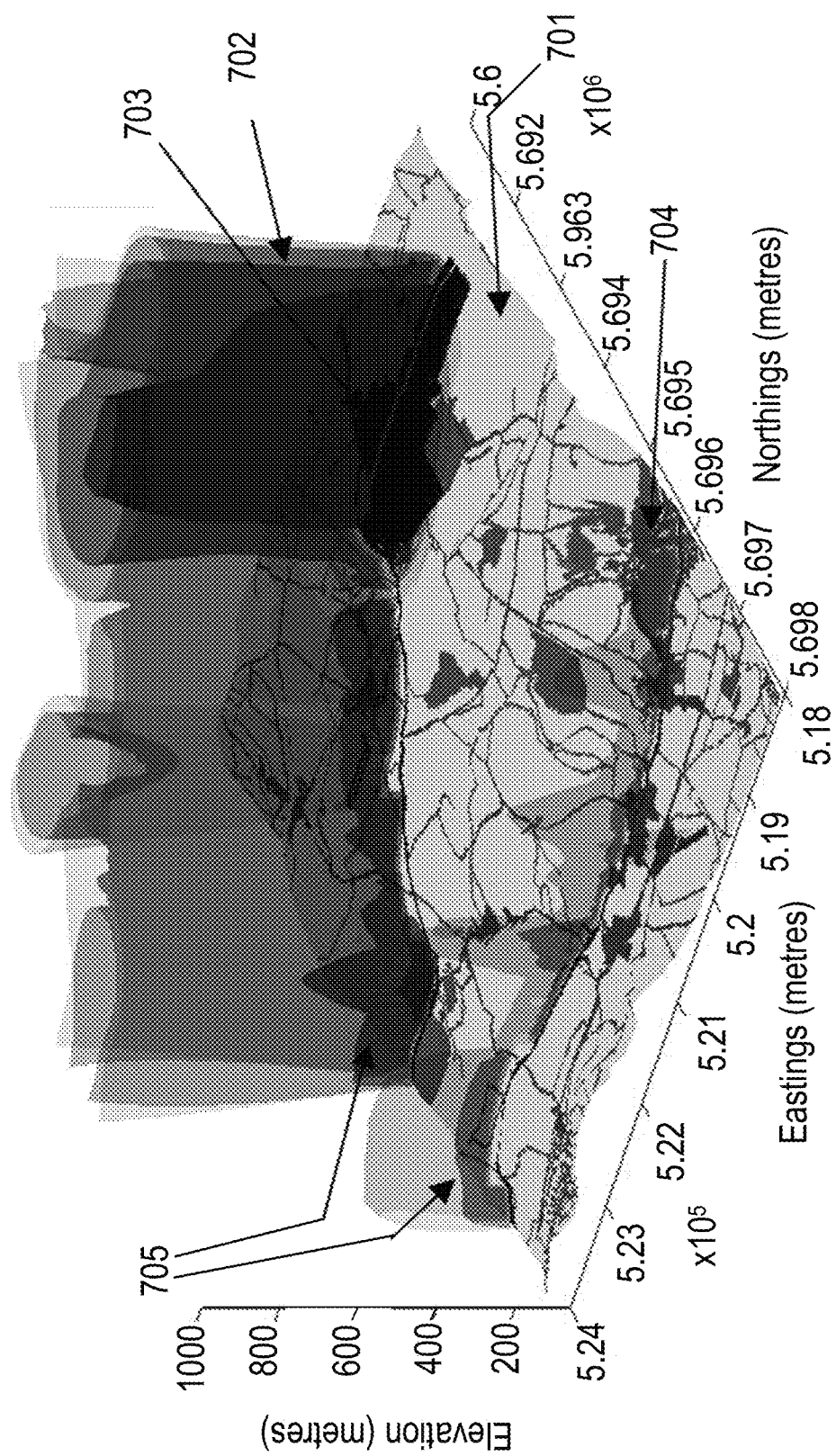
FIG. 8 shows another example of a three-dimensional liability map.

FIG. 8 shows another, more detailed, example of a 2D and 3D liability map as found in FIG. 7, but which has been exaggerated in the Z-axis in order to better illustrate the different risk liability values in the 3D liability map. As with FIG. 7, FIG. 8 shows a contour of a 2D liability map 701, and isosurfaces of a 3D liability map 702. The dark areas 703 correspond to second risk liability values in the vicinity of an airport. The areas 705 correspond to second risk liability values relating to roads, while the dark areas 704 correspond to second risk liability values relating to a town.

Figure 9:
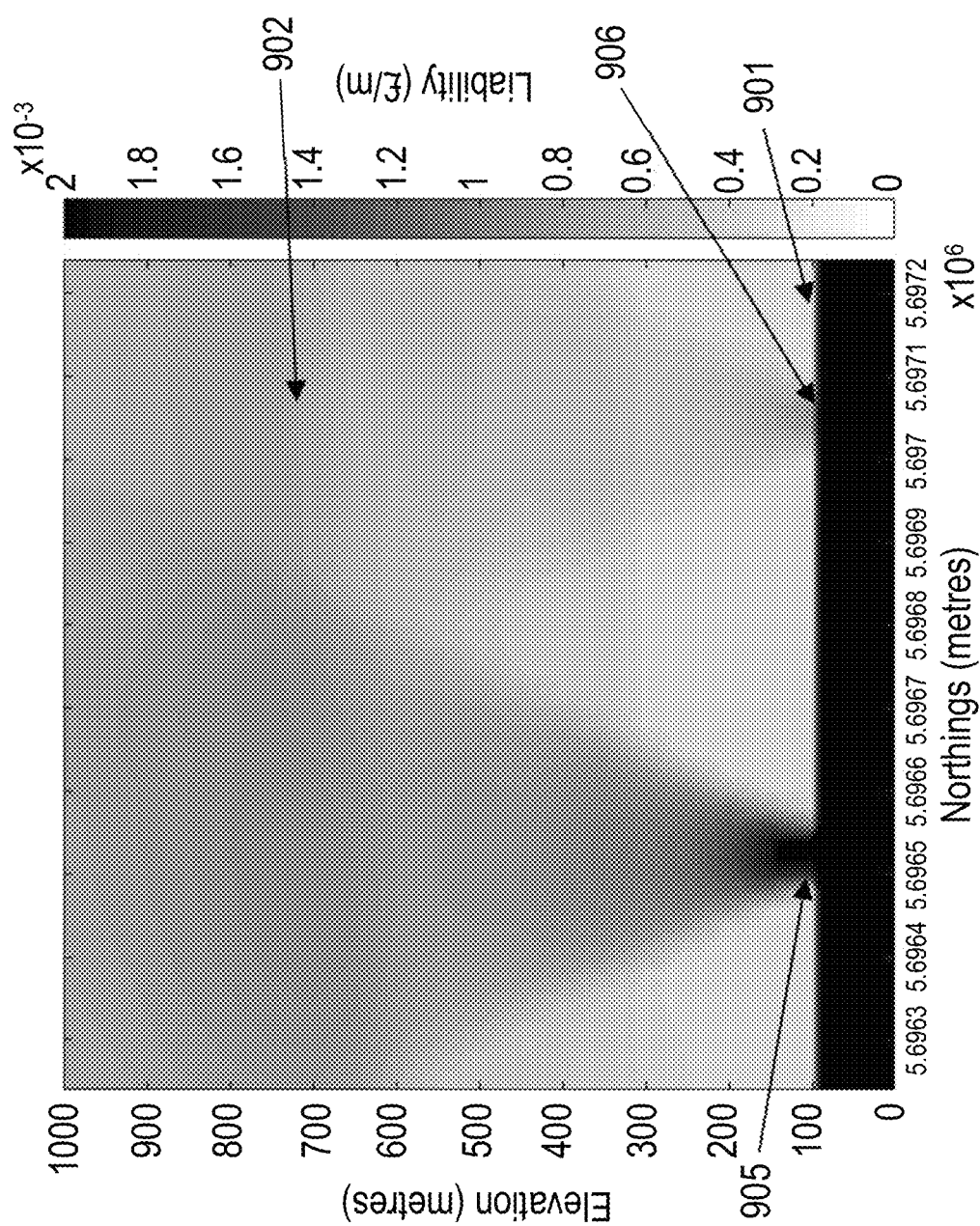
FIG. 9 shows a cross section through a three-dimensional liability map.

FIG. 9 shows an example of a two-dimensional slice through 2D and 3D liability maps 901, to help illustrate further the upward propagation of risk liability. As can be seen from FIG. 9, in this embodiment it can be seen that the second risk liability values 902 of the 3D liability map decrease as a function of height above a ground surface, and in particular above a road 905 and a railway 906.

In some embodiments, the method comprises using the first and/or second risk liability values to control a flight parameter forming part of a collision avoidance procedure, for example controlling the path of an aircraft system in order to avoid a collision. Such embodiments may be used in conjunction with probabilistic trajectory planning systems, which may be used with a similar liability approach, to provide a cost function to ensure a proportionate and safe collision avoidance response.

Figure 10:
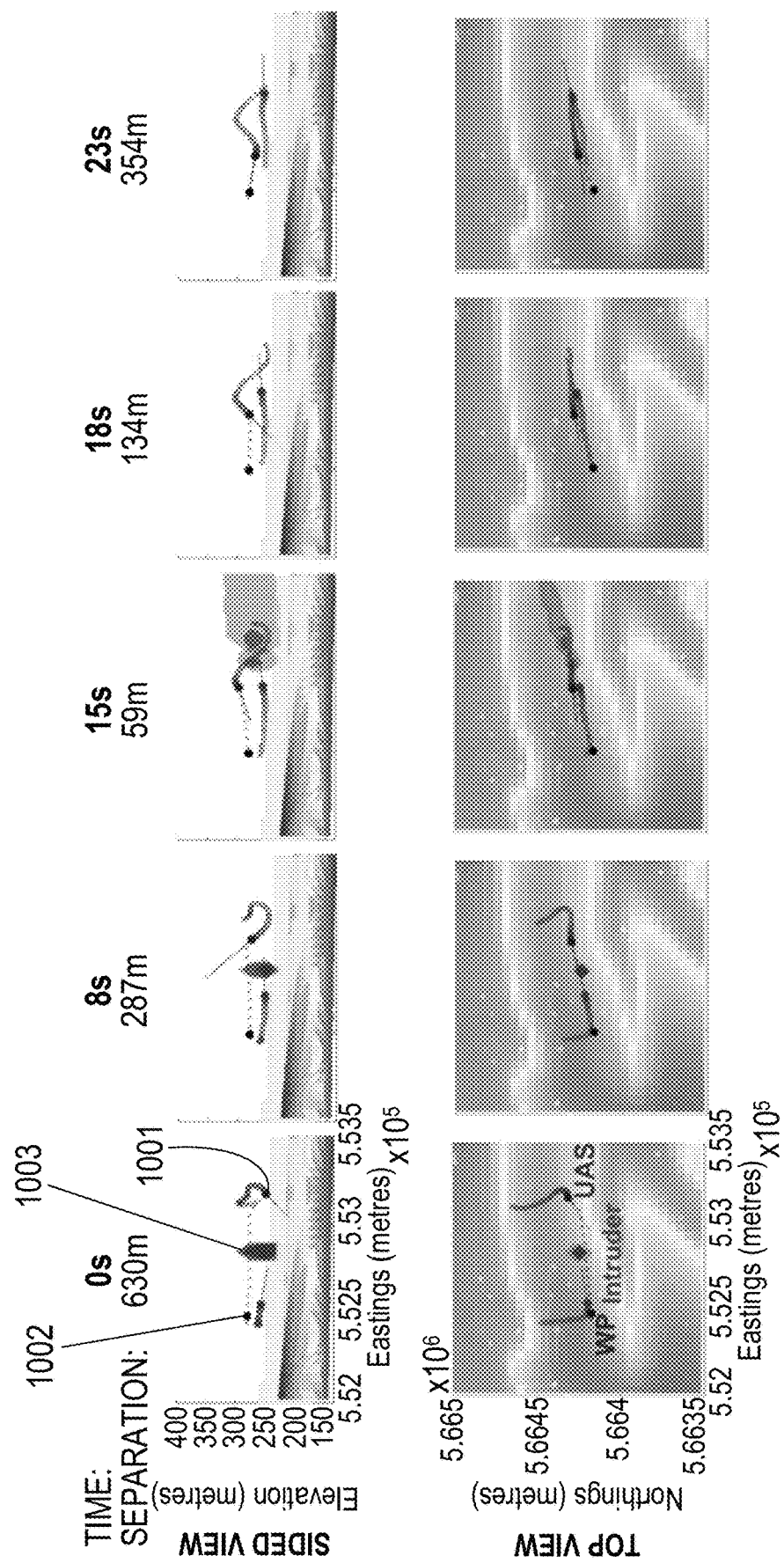
FIG. 10 shows an example of flight trial data showing proportionate collision avoidance response.

FIG. 10 shows an example of flight trial data showing proportionate collision avoidance response, with the top set of Figures showing a side view separated over time, and the bottom set of Figures showing corresponding top views separated over time. The aircraft system, for example an unmanned aircraft system (UAS) is illustrated using reference 1001, with the intruder aircraft illustrated by reference 1002. The second risk liability values are shown as a greyscale isosurface that follows the contours of the terrain but with an offset representative of obstacle height, illustrated by reference 1003. For clarity the level of the isosurface is set high to hide the detailed features observed in the second risk liability as observed in FIGS. 7 and 8. The liability associated with a probabilistic collision prediction is illustrated as an isosurface bubble using reference 1003. This uses the same units as the second risk liability value to ensure proportionality.

As can be seen from these figures, in response to a collision avoidance procedure being triggered, the aircraft system 1001 takes action to avoid the intruder 1002 whilst taking account of risk liability values associated with the 3D liability map. It will therefore give preference to lower second risk liability options and the cost associated with penetrating the second risk liability value isosurface is very high so it will also avoid the ground with a proportionate buffer. Furthermore, the ground liability exposure is necessary as a cost function, i.e. in order to provide a proportionate response. Without it there is no cost to travelling further/longer and therefore all hazards trigger extreme, disproportionate, avoidance manoeuvres.

Figure 11:
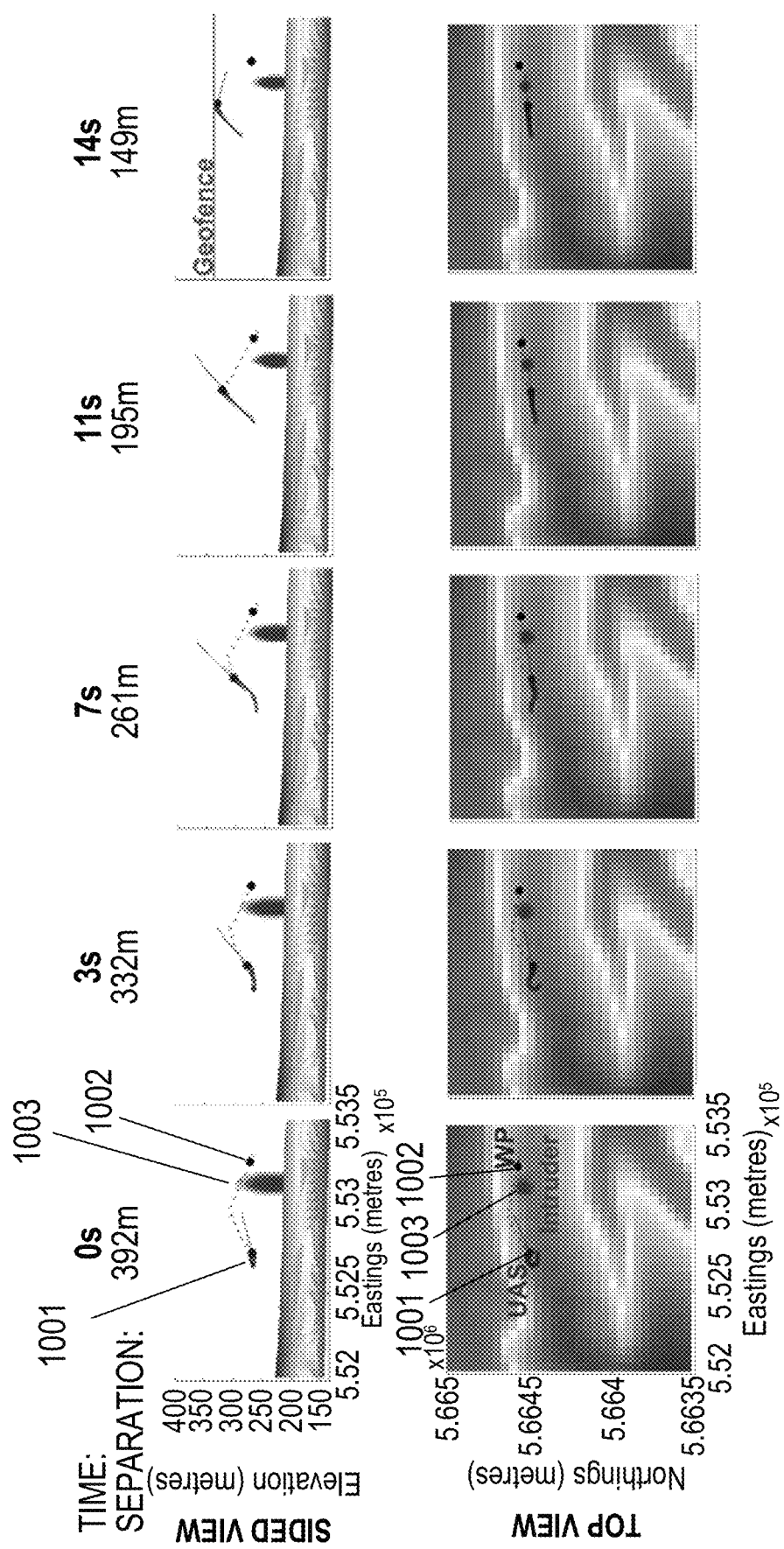
FIG. 11 shows an example of flight trial data showing disproportionate collision avoidance response.

FIG. 11 is similar to FIG. 10, in that it shows an example of flight trial data, but showing disproportionate collision avoidance response, i.e. rather than proportionate as shown in FIG. 10. As before, the top set of Figures show a side view separated over time, with the bottom set of Figures showing corresponding top views separated over time. The aircraft system, for example an unmanned aircraft system (UAS) is illustrated using reference 1001 and has a target waypoint of reference 1002. Along its path is a static, hovering, intruder aircraft, illustrated by reference 1003. As the intruder aircraft is static the liability associated with a probabilistic collision prediction is shown as a series of semi-transparent isosurfaces bubbles centered on reference 1003.

In this scenario the second risk liability value is set to zero everywhere and therefore not visible. Without external limits it will therefore fly into the ground as part of an avoidance manoeuvre. As can be seen from these figures, in response to a collision avoidance procedure being triggered, the aircraft system 1001 takes action to avoid the intruder 1003. However, because there is no risk liability as a cost function, the aircraft system climbs at its maximum rate up to its maximum altitude, such that it triggers a geofence failsafe. This is therefore a disproportionate response because there is no cost associated with liability exposure and every intruder, no matter the distance or absolute risk, will illicit an extreme avoidance manoeuvre.

Figure 12:
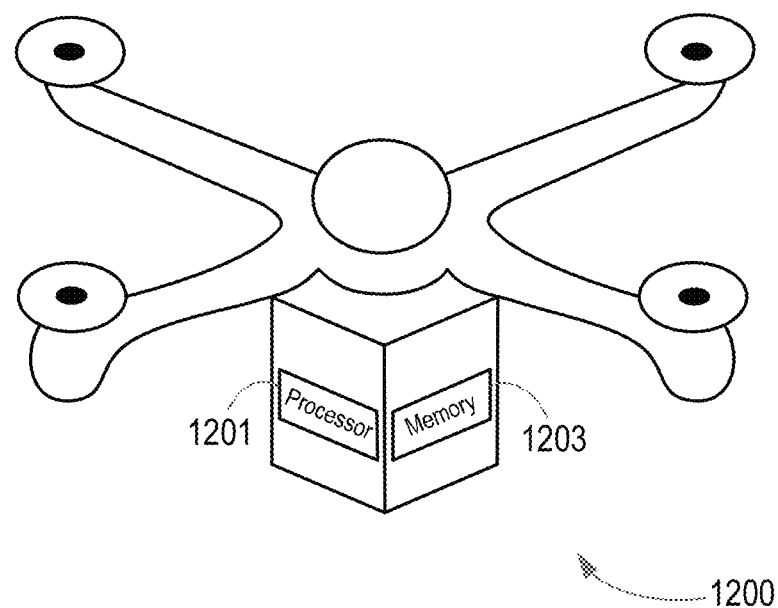
FIG. 12 shows an example of an unmanned aircraft system according to an embodiment.

FIG. 12 shows an example of an aircraft system 1200, for example an unmanned aircraft system, according to an embodiment. The aircraft system 1200 comprises a processor 1201 and a memory 1203, said memory 1203 containing instructions executable by said processor 1203.

In one example the aircraft system 1200 is operative to the use a liability map to control one or more parameters for controlling flight of the aircraft system, wherein the liability map comprises a plurality of risk liability values (L1 and/or L2) associated with one or more ground hazard categories, and wherein each ground hazard category is associated with a type of hazard on a ground surface.

In another example the aircraft system 1200 is operative to use a two-dimensional liability map, for example as described herein, to control one or more parameters for controlling flight of the aircraft system. The two-dimensional liability map comprises a plurality of first risk liability values L1 associated with the one or more ground hazard categories, and wherein each ground hazard category is associated with a type of hazard on a ground surface.

In another example the aircraft system 1200 is operative to use a three-dimensional liability map, for example as described herein, to control one or more parameters for controlling flight of the aircraft system. The three-dimensional liability map comprises a plurality of second risk liability values L2 associated with the one or more ground hazard categories, and wherein each ground hazard category is associated with a type of hazard on a ground surface.

The aircraft system 1200 may be further operative to perform the method as defined in any one of the methods described above for deriving the two-dimensional and three-dimensional liability maps, and how they are used.

In some embodiments, the aircraft system 1200 is configured to determine the 2D and/or 3D liability maps itself, for use with controlling flight, and may include the use of historical flight data and/or real time flight data.

According to another example, rather than determining the 2D and/or 3D liability maps itself, another system may be configured to determine the 2D and/or 3D liability maps in accordance with any of the embodiments described herein, for example a remote control center or flight control system (some or all of which may be cloud based), wherein the processor 1201 of the aircraft system 1200 is configured to control its fight according to the received 2D and/or 3D liability maps.

Figure 13:
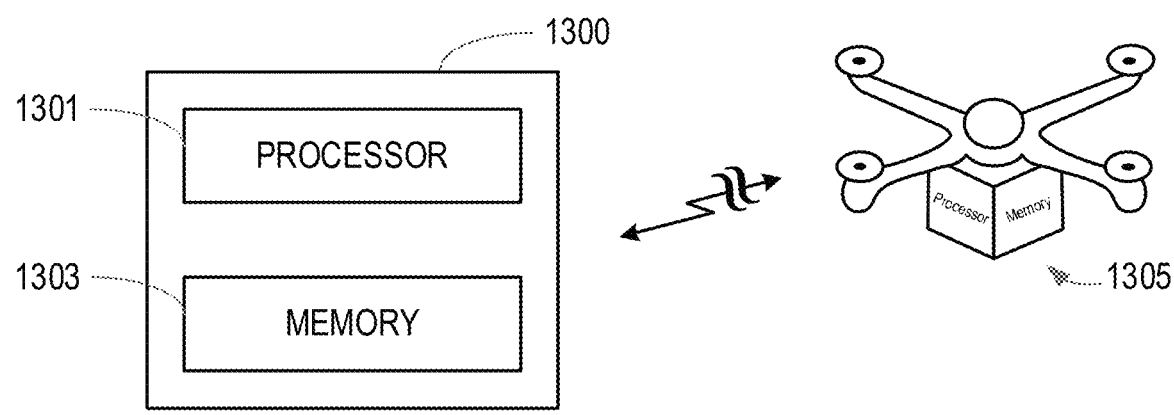
FIG. 13 shows an example of a system for controlling flight of an aircraft system according to an embodiment.

FIG. 13 shows an example of a flight control system 1300 according to another embodiment, for controlling an aircraft system 1305, for example an unmanned aircraft system. The flight control system 1300 comprises a processor 1301 and a memory 1303, said memory 1303 containing instructions executable by said processor 1301.

In one example the flight control system 1300 is operative to the use a liability map to control one or more parameters for controlling flight of the aircraft system, wherein the liability map comprises a plurality of risk liability values (L1 and/or L2) associated with one or more ground hazard categories, and wherein each ground hazard category is associated with a type of hazard on a ground surface.

In another example, the flight control system 1300 is operative to derive a two-dimensional liability map using mapping data related to one or more ground hazard categories, wherein each ground hazard category is associated with a type of hazard on a ground surface. The two-dimensional liability map comprises a plurality of first risk liability values L1 associated with the one or more ground hazard categories. The flight control system 1300 is operative to use the two-dimensional liability map to control one or more parameters for controlling flight of the aircraft system.

In another example, the flight control system 1300 is operative to use a three-dimensional liability map, for example as described herein, to control one or more parameters for controlling flight of the aircraft system. The three-dimensional liability map comprises a plurality of second risk liability values L2 associated with the one or more ground hazard categories, and wherein each ground hazard category is associated with a type of hazard on a ground surface.

The one or more parameters for controlling flight of the aircraft system 1305 may then be transmitted to the aircraft system 1305, e.g. UAS.

The flight control system 1300 may be operative to perform the method as defined in other embodiments described herein for deriving the two-dimensional and three-dimensional liability maps, and how they are used.

It is noted that in the flight control system 1300, the processing by the processor 1301 may comprise processing on a ground station (e.g. located on-site at a traffic control location), or processing at a remote server (e.g. a cloud based server), or a combination of both.

Figure 14:
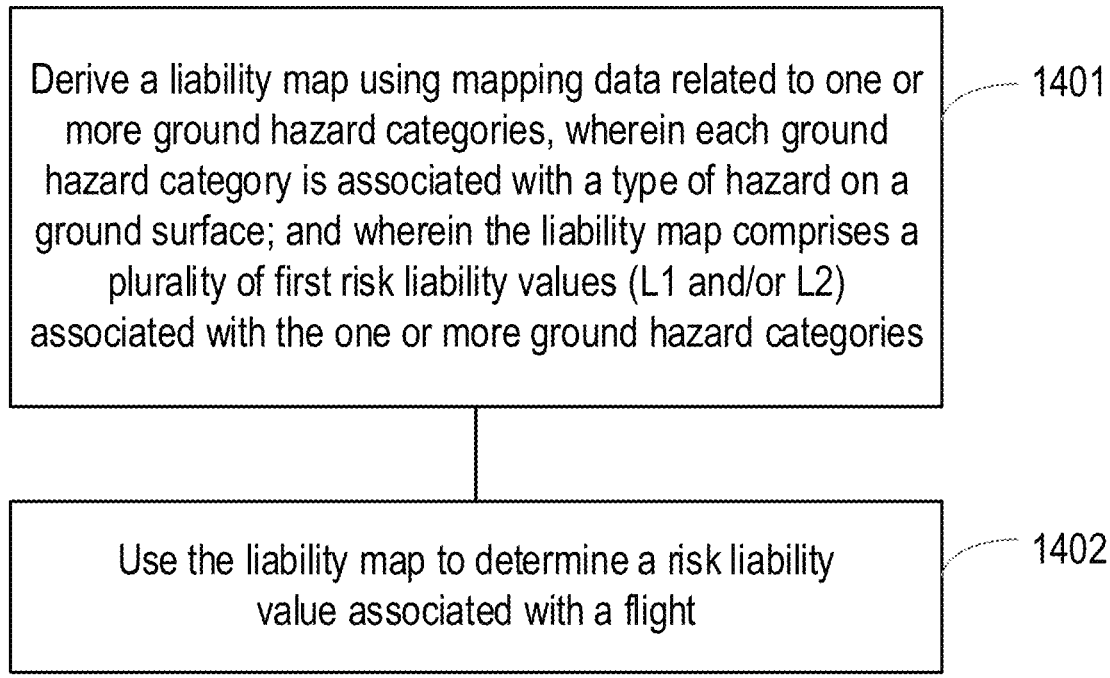
FIG. 14 shows an example of a method according to another aspect, for determining risk liability values.

FIG. 14 describes a method according to another embodiment, for determining a risk liability value associated with a flight of an aircraft system in relation to hazards on a ground surface.

According to one example the method comprises deriving a liability map using mapping data related to one or more ground hazard categories, wherein each ground hazard category is associated with a type of hazard on a ground surface, and wherein the liability map comprises a plurality of risk liability values (L1 and/or L2) associated with the one or more ground hazard categories, step 1401.

The liability map is used to determine a risk liability value ($L_{FLIGHT}$) associated with a flight, step 1402.

According to another example the method comprises deriving a two-dimensional liability map using mapping data related to one or more ground hazard categories, wherein each ground hazard category is associated with a type of hazard on a ground surface, and wherein the two-dimensional liability map comprises a plurality of first risk liability values L1 associated with the one or more ground hazard categories.

The method comprises using the two-dimensional liability map to determine a risk liability value associated with a flight.

In some embodiments deriving the two-dimensional liability map comprises: dividing a ground surface region of interest into a discretised two-dimensional grid; for each element of the grid, deriving an area of that element that falls within a relevant ground hazard category; for each ground hazard category, estimating a consequence value ($C_Y$) based on one or more characteristics of the aircraft system; and for each element of the grid, estimating a first risk liability value (L1) based on the derived area and the estimated consequence value.

For example, estimating a first risk liability value L1 may comprise:

$$L1 = \Sigma \text{area ratio} * \text{consequence value}(C_Y)$$

The method may further comprise the steps of deriving a three-dimensional liability map based on a plurality of possible failure modes of the aircraft system and a related probability frequency of the occurrence of each possible failure mode, wherein the three-dimensional liability map comprises a plurality of second risk liability values.

According to another embodiment, the method comprises deriving a three-dimensional liability map using mapping data related to the one or more ground hazard categories, wherein the three-dimensional liability map comprises a plurality of second risk liability values (L2) associated with the one or more ground hazard categories, and using the three-dimensional liability map to control the one or more parameters for controlling flight of the aircraft system.

In some embodiments, deriving the three-dimensional liability map comprises: dividing a volume of interest into a discretised three-dimensional grid of voxels centred on nodes; for each node estimating a dispersion pattern for an aircraft system as a result of each failure mode; for each failure mode estimating a risk liability value for that failure mode; and summing all the estimated risk liability values for the plurality of failure modes to estimate a second risk liability value L2 for each node.

In some examples, estimating a risk liability value for a particular failure mode at a particular node is based on the dispersion pattern for that failure node in relation to the position of the node in relation to the ground surface, and the position of the node in relation to the first risk liability values of elements of the two-dimensional liability map.

In some embodiments, determining a risk liability value associated with a flight comprises summing a plurality of first risk liability values corresponding to a path of the flight. For example, if a planned flight path of a particular aircraft system is desired to go over a plurality of grid elements $E_1$ to $E_{200}$ of a 2D liability map between a starting point and an end point, the individual first risk liability values associated with each of the plurality of grid elements $E_1$ to $E_{200}$ between the starting point and the end point may be summed in order to determine a risk liability value $L_{FLIGHT}$ for the planned flight.

In other embodiments, determining a risk liability value associated with a flight comprises summing a plurality of second risk liability values corresponding to a path of the flight. For example, if a planned flight path of a particular aircraft system is planned via a plurality of voxels $V_1$ to $V_{200}$ of a 3D liability map between a starting point and an end point, the individual second risk liability values associated with each of the plurality of voxels $V_1$ to $V_{200}$ between the starting point and the end point may be summed in order to determine a risk liability value $L_{FLIGHT}$ for the planned flight.

As noted earlier, in some examples the second risk liability values, as described above, are derived from the first risk liability values, e.g. as a processing step to calculate the second risk liability values. However, it is noted that the second risk liability values may be determined without necessary deriving the first risk liability values beforehand, for example using other information, including for example mapping data, ground hazard data, consequence data, aircraft system data. It is noted that determining the first risk liability values can be useful for providing other useful applications, such as selecting emergency landing sites, or providing a simplified (e.g. computationally faster but less accurate) version to use the first liability values for path planning.

In some examples, this risk liability value $L_{FLIGHT}$ for a planned flight may be used to determine whether the path of the planned flight should be changed, for example by searching for an alternative flight path having a lower risk liability value.

In some examples a planned flight may only be allowed to take place if the risk liability value $L_{FLIGHT}$ is below a certain threshold.

In other embodiments, this risk liability value $L_{FLIGHT}$ for a planned flight may be used to determine an insurance premium associated with that planned flight. In some examples different flight paths, or portions of flight paths, may have insurance premium associated with the risk liability values determined for those flight paths, or portions of flight paths. In this way, an insurance premium can be associated with real ground hazard data, e.g. based on the ground hazard categories, and how they are used in the 2D and 3D liability maps in conjunction with different aircraft system types and different failure modes.

Figure 15:
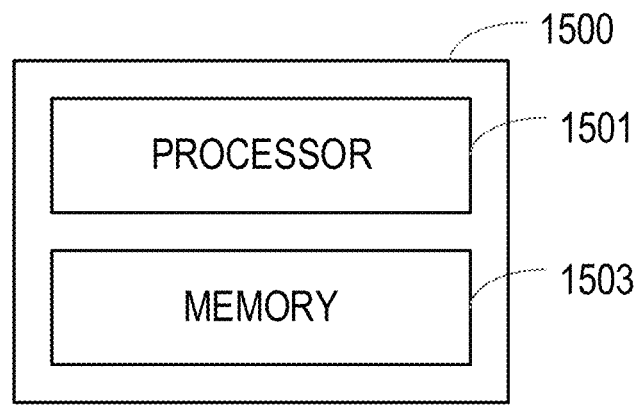
FIG. 15 shows an example of a risk liability engine.

FIG. 15 shows an example of a risk liability engine 1500 for determining a risk liability value associated with a flight of an aircraft system in relation to hazards on a ground surface. The risk liability engine 1500 comprises a processor 1501 and a memory 1503, said memory 1503 containing instructions executable by said processor 1501.

In one example, the risk liability engine 1500 is operative to: derive a liability map using mapping data related to one or more ground hazard categories, wherein each ground hazard category is associated with a type of hazard on a ground surface, wherein the liability map comprises a plurality of risk liability values (L1 and/or L2) associated with the one or more ground hazard categories; and, use the liability map to determine a risk liability value ($L_{FLIGHT}$) associated with a flight.

In another example, the risk liability engine 1500 is operative to: derive a two-dimensional liability map using mapping data related to one or more ground hazard categories, wherein each ground hazard category is associated with a type of hazard on a ground surface; and wherein the two-dimensional liability map comprises a plurality of first risk liability values L1 associated with the one or more ground hazard categories; and use the two-dimensional liability map to determine a risk liability value associated with a flight.

In another example, the risk liability engine 1500 is operative to: derive a three-dimensional liability map using mapping data related to one or more ground hazard categories, wherein each ground hazard category is associated with a type of hazard on a ground surface; and wherein the three-dimensional liability map comprises a plurality of second risk liability values L2 associated with the one or more ground hazard categories; and use the three-dimensional liability map to determine a risk liability value associated with a flight.

The risk liability engine 1500 may be operative to perform the method as described in any of the embodiments herein.

From the above it can be seen that, in some embodiments described herein the risk liability values may be numerical values, e.g. for use with controlling other parameters, such as flight control parameters. In such embodiments the first and/or second risk liability values may be used to control the flight path of an aircraft system, for example to reduce a potential risk or liability. An aircraft system may be controlled dynamically using the first and/or second risk liability values, including for example in response to an emergency situation, e.g. to find a suitable path for landing, or to avoid a potential collision. In some embodiments, in high-risk regions, an aircraft system is controlled to fly at higher altitudes (which has an advantage of providing an option for the aircraft system to glide clear of a hazard in the event of a controlled system failure). In low-risk regions (e.g. fields) an aircraft system may be controlled to fly, for example, at low altitude so as to minimise dispersion in the event of an uncontrolled system failure.

In other embodiments the first and/or second risk liability values may be associated with financial values, for example to estimate an insurance premium associated with a particular flight path of an aircraft system, for example giving a range of liability values, e.g. between £0.4 per km to £500 per km. This has an advantage of enabling an insurer provider to distinguish between operations in a relevant manner.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim. "a" or "an" does not exclude a plurality, and a single processor or other unit may fulfil the functions of several units recited in the claims. Any reference signs in the claims shall not be construed so as to limit their scope.

The invention claimed is:

1. A method for controlling flight of an aircraft system, the method comprising:
   deriving a two-dimensional liability map using mapping data related to one or more ground hazard categories, wherein each ground hazard category is associated with a type of hazard on a ground surface, wherein the two-dimensional liability map comprises a plurality of risk liability values (L1) associated with the one or more ground hazard categories; and
   using the liability map to control one or more parameters for controlling flight of the aircraft system, wherein deriving the two-dimensional liability map comprises:

dividing a ground surface region of interest into a discretized two-dimensional grid;

for each element of the grid, deriving an amount of area of that element that falls within a relevant ground hazard category;

for each ground hazard category, estimating a consequence value ($C_Y$) based on a size of the aircraft system; and for each element of the grid, estimating a first risk liability value (L1) based on the derived amount of area of the element and the estimated consequence value, wherein estimating a first risk liability value (L1) comprises:

$L1 = \Sigma$ area ratio for a particular ground hazard*consequence value($C_Y$).

2. The method as claimed in claim 1, wherein deriving the amount of area of the element that falls within a relevant ground hazard category comprises the use of mapping data.

3. The method as claimed in claim 1, wherein one or more parameters for controlling flight are controlled in relation to the first risk liability values (L1).

4. The method as claimed in claim 2, further comprising controlling a flight parameter forming part of a collision avoidance procedure.

5. A flight control system for controlling an aircraft system, and comprising a processor and a memory, said memory containing instructions executable by said processor, whereby said flight control system is operative to:

derive a two-dimensional liability map using mapping data related to one or more ground hazard categories, wherein each ground hazard category is associated with a type of hazard on a ground surface; and wherein the two-dimensional liability map comprises a plurality of risk liability values (L1 or L2) associated with the one or more ground hazard categories; and use the liability map to control one or more parameters for controlling flight of the aircraft system, whereby said flight control system is operable to derive the two-dimensional liability map by:

dividing a ground surface region of interest into a discretized two-dimensional grid;

for each element of the grid, deriving an amount of area of that element that falls within a relevant ground hazard category;

for each ground hazard category, estimating a consequence value ($C_Y$) based on a size of the aircraft system; and for each element of the grid, estimating a first risk liability value (L1) based on the derived amount of area of the element and the estimated consequence value, wherein estimating a first risk liability value (L1) comprises:

$L1 = \Sigma$ area ratio for a particular ground hazard*consequence value($C_Y$).

6. A flight control system operative to perform the method as defined in claim 1.

7. The flight control system as claimed in claim 5, wherein the aircraft system is an unmanned aircraft system (UAS).

8. A method for controlling flight of an aircraft system, the method comprising:

deriving a three-dimensional liability map using mapping data related to one or more ground hazard categories, wherein each ground hazard category is associated with a type of hazard on a ground surface, wherein the three-dimensional liability map comprises a plurality of risk liability values associated with the one or more ground hazard categories; and using the liability map to control one or more parameters for controlling flight of the aircraft system, wherein the step of deriving a three-dimensional liability map is based on a plurality of possible failure modes of the aircraft system and respective probability frequencies of the occurrence of each possible failure mode, and the plurality of failure modes comprises two or more of: uncontrolled glide, controlled glide, and break-up.

9. The method as claimed in claim 8, wherein deriving the three-dimensional liability map comprises:

dividing a volume of interest into a discretized three-dimensional grid of voxels centered on nodes;

for each node estimating a dispersion pattern for an aircraft system as a result of each failure mode;

for each failure mode estimating a risk liability value for that failure mode; and summing all the estimated risk liability values for the plurality of failure modes to estimate a second risk liability value (L2) for each node.

10. The method as claimed in claim 9, wherein estimating a risk liability value for a particular failure mode at a particular node is based on the dispersion pattern for that failure node in relation to the position of the node in relation to the ground surface, and the position of the node in relation to first risk liability values of elements of a two-dimensional liability map.

11. The method as claimed in claim 8, wherein one or more parameters for controlling flight are controlled in relation to the risk liability values (L1).

12. The method as claimed in claim 8, wherein one or more parameters for controlling flight are controlled in relation to second risk liability values (L2).

13. The method as claimed in claim 8, further comprising controlling a flight parameter forming part of a collision avoidance procedure.

* * * * *